United States Patent [19]

Heller

[11] 4,245,391

[45] Jan. 20, 1981

[54] GOLF CLUB ADJUSTMENT APPARATUS

[76] Inventor: Walter R. Heller, 4 N. 321 Route 53, Addison, Ill. 60601

[21] Appl. No.: 57,218

[22] Filed: Jul. 13, 1979

[51] Int. Cl.$^3$ .............................................. G01B 5/24
[52] U.S. Cl. .................................... 33/174 F; 72/293
[58] Field of Search ........................ 33/174 F, 174 N; 72/293

[56] References Cited

U.S. PATENT DOCUMENTS

| 2,546,426 | 3/1951 | Bryant | 33/174 F |
| 3,439,429 | 4/1969 | Sundstrom | 33/174 F |
| 4,094,072 | 6/1978 | Erb | 33/174 F |

*Primary Examiner*—Willis Little
*Attorney, Agent, or Firm*—Robert L. Lindgren; Lloyd L. Zickert

[57] ABSTRACT

A golf club adjusting apparatus for modifying the relationship of the club shaft and head which includes a base for supporting the club at spaced first and second preselected positions. A force applying element positioned intermediate the first and second support positions for controlled, precise club adjustment without damage, and an adjustment measuring element for determining the degree of adjustment.

7 Claims, 3 Drawing Figures

U.S. Patent
Jan. 20, 1981
4,245,391
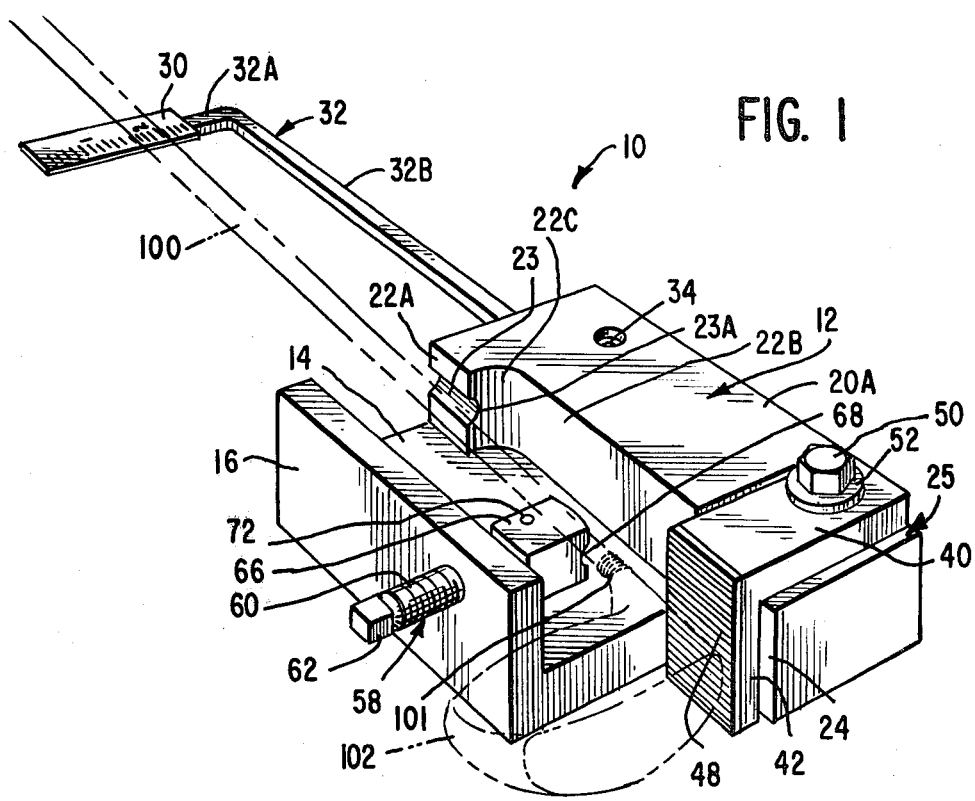
FIG. 1
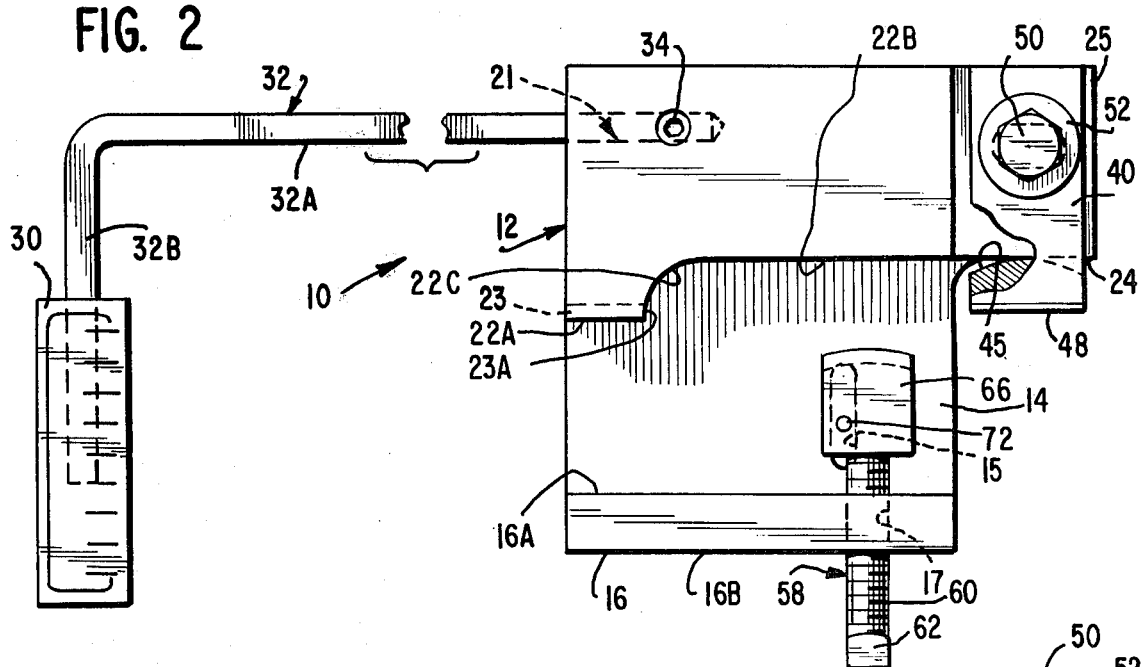
FIG. 2
FIG. 3

GOLF CLUB ADJUSTMENT APPARATUS

BACKGROUND OF THE INVENTION

This invention relates to a golf club adjustment device which is particularly useful for fitting the lie of a wood to a particular person.

Of increasing importance to the continued improvement of the play of serious golfers is the custom fitting of mass produced matched woods to the widely varying critical body dimensions of potential club purchasers. Of particular importance is the need to customize woods to provide a lie which correctly relates each particular wood to the user's stance and arm length.

Since few have the economic means to have a set of golf clubs custom designed and made for them, the present invention provides a simple device for producing the precise controlled adjustment of mass produced clubs to accommodate each to the particular needs of an individual player.

THE PRIOR ART

In the prior art of which applicant is presently aware, U.S. Pat. No. 2,973,581, to Rhodehamel describes a device which can be used to calibrate both the loft and lie of an iron. The calibration device of this patent is designed for use with an independent wrench to impart a bending force to the hosel of the iron once the head of the iron has been securely clamped between a pair of flanges.

A U.S. Pat. No. 3,191,936 to Guier discloses a putter having a ductile metal neck. The object of this patent is to build a structure into a club which simplifies bending adjustment of the lie of the club.

The apparatus of the present invention provides for adjustment of the head and shaft relationship of woods without marring or scratching the club surfaces or hosel thread wrappings. The prior art devices, because of their construction and operation, were limited to use with irons. However, the present invention does not require that the head, hosel or shaft of the club be clamped in any manner which could otherwise damage or mar the club during adjustment. Because of the threaded securement of the hosel of a wood headed club to its metal shaft, any deflection of the shaft during adjustment to customize the lie of the club to an owner's golfing stance calls for care and controlled, precise adjustment. In addition, the structural simplicity of the apparatus of the present invention and its ease of use with minimal mechanical skill overcomes many of the problems associated with the use of prior art devices.

SUMMARY OF THE INVENTION

The invention includes a golf club adjustment apparatus which is particularly designed to support a portion of the shaft of a wood at one point and to adjustably support the thread wrapped hosel portion of the wood adjacent the head at another point. With the head supported in this manner but not clamped, an opposed pressure shoe can be threaded into engagement with the shaft portion immediately adjacent the hosel. Once pressure shoe engagement has been established, continued incremental threading of the shoe will produce precisely controlled and gradual deflection of the shaft relative to the head and particularly, the heel portion thereof to realign the heel with respect to the shaft in accordance with the stance and arm length of the club user as determined by a professional golfer.

Calibration means on the device facilitates precise adjustment of the head and shaft to assure a correct lie for the individual golfer.

DESCRIPTION OF THE DRAWINGS

For a more complete understanding of the invention, reference is made to the drawings, in which:

FIG. 1 is a perspective view of a golf club bending apparatus according to the present invention;

FIG. 2 is a partially fragmented top plan view of the invention of FIG. 1; and

FIG. 3 is a partially fragmented side elevational view of the invention of FIG. 2.

DESCRIPTION OF THE PREFERRED EMBODIMENT

Referring now to the drawing, FIG. 1 shows a golf club adjusting apparatus according to the present invention generally designated by the reference numeral 10. An aluminum base plate or block, generally designated by the reference numeral 12, includes an integral upper flange 16 which is interconnected by an integral web 14 to the base block or plate 12. The base block or plate 12 includes first and second surfaces 22A and 22B, which intersect the web 14 at a right angle. The first surface 22A is generally nearer to the upper flange 16 than the second surface 22B. The first surface 22A is grooved to form a first channel 23, which runs in a direction generally parallel to the length of the base plate. A curvilinear portion 22C interconnects the first surface with the second surface 22B. The channel 23 is designed to engage the shaft 100 of the club, as shown in FIG. 1, and to correctly orient the club for adjustment.

An extended shoulder portion 24, for engaging the underside of a rotatable club adjustment support 40, projects from second surface 22B and includes a recessed portion, generally designated 25. The club adjustment support 40 is a generally L-shaped body having an arm 42. A bolt 50 is inserted through support 40. The bolt 50 is threaded into the planar surface of the recessed portion 25 to accommodate retention of the adjustment support 40 substantially as shown in FIGS. 1, 2 and 3. A washer 52 is placed between the head of the bolt 50 and the head adjustment 40 to facilitate rotation of the support 40.

As can be best seen in FIG. 1, the arm 42 extends from the club adjustment support 40 at a right angle and is provided with an overlying upper rubber padded surface 48. The rubber pad 48 is designed to act as a resilient support for the club and particularly the thread wrapped hosel 101 adjacent the head 102 of the club. The underside 45 of arm 42 is curved to permit rotation thereof and infinite positioning of the arm to accommodate numerous club shapes and varying hosel and club head dimensions. The curved underside 45 allows the adjustment support 40 to rotate about the center of the bolt 50 threaded into surface 25 of shoulder 24 according to club shape.

The upper flange 16 is formed with a threaded passage 17 which is axially directed toward said base block 12. The upper flange 16 includes a generally planar surface, 16A best viewable in FIG. 2 through which the threaded aperture 17 opens.

An adjusting shaft 58 is threaded through the passage 17 in the upper flange 16. The threads 60 thereon are matable with the threads of the threaded passage 17 to permit axial incremental movement of the shaft 58 toward and away from the base block 12. One end of the shaft 58 is provided with a generally square head 62 which may be utilized with a wrench or similar tool to apply a torque to the adjusting shaft 58 and thereby rotate the shaft 58 into or out of the passage. The end of the adjusting shaft 58 opposite head 62 is journalled to cubic pressure shoe 66 utilizing a ball and socket arrangement (not shown in the drawings). The side of the pressure shoe 66 facing surface 22B is generally parallel to it and is formed with a club orienting channel 68 aligned co-axially with channel 23 and is designed to engage the club shaft 100 adjacent hosel 101 in predetermined relationship with channel 23.

Referring now to FIGS. 2 and 3, an elongated transverse slot 15 provided in web 14 is shown to extend through web 14. A spring pin 72 inserted through an aperture in the pressure shoe 66 extends therefrom into the slot 15. As is shown in FIG. 3, this spring pin 72 will limit rotation of the pressure shoe 66 so that misalignment of the channel 68 with channel 23 and the shaft 100 of the golf club can be minimized.

The base block 12 includes another passage 21, best viewed in FIG. 2. This passage receives an end of the extended portion 32A of a generally L-shaped indicator element 32. At the end 32B of the indicator element 32, an indicator plate 30 is mounted by welding, soldering or screw means, as shown in FIGS. 1 and 2. The indicator plate is scaled, as is indicated in FIG. 1, to show the amount of adjustment being imparted to the golf club shaft 100 during adjustment. The extended portion 32A is retained in the base flange 20 by use of a set screw 34.

In operation, a golf club is placed beneath the upper flange 16 as shown in FIG. 1. The thread wrapped hosel 101 is brought to rest against the rubber padded portion 48 of the arm 42 of the adjustment support 40. Rotation of the arm 42 will provide correct alignment between pad 48 and hosel 101. The shaft 100 of the club extends toward the indicator plate, passing through the channel 23 of the first surface 22A. The remainder of the shaft 100 of the golf club extends past the indicator plate 30.

The adjusting screw 58 is threaded down to bring the channel 68 of the pressure shoe 66 into contact with the shaft of the club at a point generally intermediate the points of contact of the golf club with the rubber pad 48 and the first surface 22A. Further tightening of the adjusting screw 58 and corresponding movement of the pressure shoe 66 toward the base flange 20 exerts a deflecting force upon the shaft and hosel of the golf club and a corresponding permanent deflection adjustment thereof occurs. This deflecting movement of the club shaft 100 is accompanied by a corresponding pivoting movement of the shaft about a front ridge 23A of the first channel 23. This pivoting movement is translatable via the scale on indicator plate 30, into a measure of the degree of deflection.

When the desired amount of adjustment has been imparted between the golf club shaft 100 and hosel 101, the adjusting screw 58 is threaded counterclockwise to move the pressure shoe 66 out of engagement with the golf club shaft and hosel.

I claim:

1. A golf club adjusting apparatus for modifying the relationship of the club shaft and head comprising:
    a base element including means for supporting the club shaft at a first position and means for supporting a portion of the club adjacent the hosel at a second position spaced a predetermined distance from the first position;
    means on the base for applying a deflecting force to the club at a third selected position intermediate the first and second positions to produce controlled deflection of the golf club shaft relative to the club head to selectively modify the shaft - head relationship, without damaging or marring any of the club surface; and
    means for indicating the amount of said controlled deflection.

2. The apparatus of claim 1, wherein the means for applying a force comprises
    a pressure shoe for engaging the club at the third selected position;
    an externally threaded shaft having an end thereof rotatably journalled in an end of the pressure shoe; and
    a threaded passage in the base for rotatable threaded engagement with the threaded shaft whereby the pressure shoe may be rotated into force applying contact with the golf club being adjusted.

3. The apparatus of claim 2, wherein the adjusting apparatus includes means for limiting rotation of said pressure shoe comprising
    an elongated slot in the base; and
    a protrusion extending from said pressure shoe into said slot means to limit turning movement of the pressure shoe.

4. The apparatus of claim 1, wherein the adjusting apparatus further includes an adjustable club support and fastening means for adjustably securing the support to the base to provide selectively adjustable club support to accommodate varying club dimensions.

5. The apparatus of claim 4, wherein the club support is provided with a resilient upper surface.

6. The apparatus of claim 1, wherein the first shaft support position on the base is grooved to orient the shaft relative to the base and the pressure shoe is similarly grooved for orientation relative to the first groove to control force application.

7. The apparatus of claim 1, wherein said means for indicating the amount of said controlled deflection, includes an indicator plate having a graduated display scale means thereon for aligning with the shaft of a club being adjusted to indicate the amount of said controlled deflection, wherein said indicator plate may be removably secured to said base in a fixed spacial relationship thereto.

8. A golf club adjusting apparatus for modifying the relationship of the club shaft and head comprising
    a base block;
    an upper flange connected to the base block by an integral web;
    adjustable club support on the base block for supporting the hosel area of a club placed thereon and including a padded club support surface, an opposed surface means for engaging the base to provide plural orientations relative to the base and means for adjustably securing the club support to the base block;
    a deflection indicator for displaying the amount of adjustment being imparted to a golf club including a calibrated scale plate and means for securing the deflection indicator to the base block;
    means for applying an adjusting force to the golf club including:

a pressure shoe for engaging the golf club and having a channel cut therein, for receipt of a portion of the club, a threaded passage through the upper flange means at a point generally intermediate the length of said upper flange means, and an externally threaded shaft having an end thereof journalled in the pressure shoe and being threaded into the passage, the other end of the shaft being provided with a torque applying means to rotate the shaft and pressure shoe relative to the base block;

a slot in the web and extending normally relative to the upper flange;

a spring pin having an end removably insertable through an aperture in the pressure shoe and another end projecting into the slot to limit rotation of the pressure shoe;

the base block includes spaced first and second surfaces facing the upper flange means;

the first surface defining a channel for engaging and orienting the club shaft in a preselected relation to the base block and the second surface including a shoulder carrying the adjustable club support.

* * * * *